US012712440B2

(12) United States Patent
Yuan et al.

(10) Patent No.: US 12,712,440 B2
(45) Date of Patent: Aug. 18, 2026

(54) POWER CONTROL OF A PLURALITY OF POWER CONVERTERS

(71) Applicant: Hitachi Energy Ltd, Zürich (CH)

(72) Inventors: ChunMing Yuan, Beijing (CN); Juergen Steinke, Albbruck (DE)

(73) Assignee: Hitachi Energy Ltd, Zürich (CH)

(*) Notice: Subject to any disclaimer, the term of this patent is extended or adjusted under 35 U.S.C. 154(b) by 294 days.

(21) Appl. No.: 18/580,679

(22) PCT Filed: Jul. 22, 2022

(86) PCT No.: PCT/EP2022/070684
§ 371 (c)(1),
(2) Date: Jan. 19, 2024

(87) PCT Pub. No.: WO2023/002040
PCT Pub. Date: Jan. 26, 2023

(65) Prior Publication Data

US 2025/0088094 A1 Mar. 13, 2025

(30) Foreign Application Priority Data

Jul. 22, 2021 (CN) ........................ 202110831477.4
Jul. 30, 2021 (EP) .................................... 21188898

(51) Int. Cl.
*H02M 1/36* (2007.01)
*H02M 1/00* (2006.01)
(Continued)

(52) U.S. Cl.
CPC ........... *H02M 1/36* (2013.01); *H02M 1/0064* (2021.05); *H02M 1/0074* (2021.05);
(Continued)

(58) Field of Classification Search
CPC .. H02M 1/36; H02M 3/33573; H02M 1/0077; H02M 1/0064; H02M 1/0074; H02M 1/14; H02M 3/33592
See application file for complete search history.

(56) References Cited

U.S. PATENT DOCUMENTS 8,502,470 B2 * 8/2013 Barnett .................. H05B 47/19
315/297
2025/0132660 A1 * 4/2025 Yuan ................. H02M 3/33573

FOREIGN PATENT DOCUMENTS

CN 102638045 A 8/2012
CN 104718104 A 6/2015
(Continued)

OTHER PUBLICATIONS

Office Action, Japanese Patent Application No. 2024-503625, mailed Sep. 24, 2025, 7 pages.
(Continued)

*Primary Examiner* — Adolf D Berhane
(74) *Attorney, Agent, or Firm* — Sage Patent Group

(57) ABSTRACT

The present disclosure relates to a method for power control of a plurality of power converters forming a common power converter, the method including: determining a number of power converters to be deactivated of the plurality of power converters based on at least one load condition of the common power converter; and deactivating the determined number of power converters of the plurality of power converters. The present disclosure also relates to a corresponding device for power control.

20 Claims, 8 Drawing Sheets

(51) Int. Cl.
*H02M 1/14* (2006.01)
*H02M 3/335* (2006.01)

(52) U.S. Cl.
CPC ........... *H02M 1/0077* (2021.05); *H02M 1/14* (2013.01); *H02M 3/33573* (2021.05); *H02M 3/33592* (2013.01)

(56) References Cited

FOREIGN PATENT DOCUMENTS

| | | | |
|---|---|---|---|
| CN | 104852599 | A | 8/2015 |
| CN | 109428467 | A | 3/2019 |
| CN | 114696619 | A | 7/2022 |
| DE | 102014220434 | A1 | 4/2016 |
| JP | H0591743 | A | 4/1993 |
| JP | 2009159691 | A | 7/2009 |
| JP | 2009254082 | A | 10/2009 |
| JP | 2015029364 | A | 2/2015 |
| JP | 2015508277 | A | 3/2015 |
| JP | 2019041428 | A | 3/2019 |

OTHER PUBLICATIONS

Nieben, Martin et al., "Two-Staged 50kW DC-Charger with Output Voltage Range from 200V to 940V," PCIM Europe digital days, Jul. 7-8, 2020, 8 pages.
Extended European Search Report for European Patent Application No. 21188898.7, dated Jan. 20, 2022, 12 pages.
S.M., Shiva et al., "A new phase shedding and phase adding control scheme for interleaved DAB converter operating in IPOP configuration," 2015 IEEE International Telecommunications Energy Conference (INTELEC), Oct. 18, 2015, 6 pages.
Jafari, Armin et al., "Enhanced DAB for Efficiency Preservation Using Adjustable-Tap High-Frequency Transformer," IEEE Transactions on Power Electronics, Institute of Electrical and Electronics Engineers, vol. 35, No. 7, Dec. 9, 2019, 5 pages.
Ma, Dajun et al., "A Review of Voltage/Current Sharing Techniques for Series-Parallel-Connected Modular Power Conversion Systems", IEEE Transactions on Power Electronics, Institute of Electrical and Electronics Engineers, vol. 35, No. 11, Apr. 3, 2020, 18 pages.
International Search Report and Written Opinion of the International Searching Authority, PCT/EP2022/070684, mailed Oct. 24, 2022, 13 pages.
Written Opinion of the International Preliminary Examining Authority, PCT/EP2022/070684, mailed Jun. 22, 2023, 10 pages.
Pistollato, Simone et al., "Analysis and Performance Evaluation of the DAB and IBCI DC-DC Converter Topologies", IECON 2019—45th Annual Conference of the IEEE Industrial Electronics Society, vol. 1, Oct. 14, 2019, 6 pages.
International Preliminary Report on Patentability of the International Preliminary Examining Authority, PCT/EP2022/070684, mailed Oct. 11, 2023, 24 pages.
Decision to Grant, JP Patent Application No. 2024-503625, mailed Mar. 17, 2026, 3 pages.
First Office Action, CN Patent Application No. 202110831477.4, mailed Feb. 10, 2026, 10 pages.

* cited by examiner

POWER CONTROL OF A PLURALITY OF POWER CONVERTERS

CROSS REFERENCE TO RELATED APPLICATIONS

This application is a 35 U.S.C. § 371 national stage application of PCT International Application No. PCT/EP2022/070684 filed on Jul. 22, 2022, which in turn claims foreign priority to European Patent Application No. 21188898.7, filed on Jul. 30, 2021, and to Chinese Patent Application No. 202110831477.4, filed on Jul. 22, 2021, the disclosures and content of which are incorporated by reference herein in their entirety.

BACKGROUND

The present disclosure relates to a method and a device for power control of a plurality of power converters.

A solid state transformer (SST) is a controllable power converter used widely in applications with varying load conditions. In some applications such as a data center and an EV charging station, SSTs require a wide power and voltage range. For instance, a SST designed to transfer a full power may be required by the load to transfer only a fraction of the designed full power, i.e. at 30% of the designed full power.

A power converter transferring a lower power with respect to a designed full power may not achieve the highest power efficiency. The power efficiency varies as a function of transferred power and voltage ratio between the output and the input of a power converter. The power efficiency reduces significantly when the converter transfers lower power than the designed full power transfer. For instance, an example converter transferring a designed full power achieves 98% of efficiency whereas the example converter transferring a quarter of the designed full power achieves 82% of efficiency.

Thus, there is a need to improve the power transfer efficiency when a power converter transfers lower power with respect to the designed full power.

SUMMARY

The present disclosure relates to a method for power control of a plurality of power converters.

Various exemplary embodiments of the present disclosure disclosed herein are directed to providing features that will become readily apparent by reference to the following description when taken in conjunction with the accompanying drawings. In accordance with various embodiments, exemplary systems, methods, and devices are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

One example aspect of the present disclosure is directed to a method for power control of a plurality of power converters forming a common power converter. The method may include determining a number of power converters to be deactivated of the plurality of power converters based on load conditions of the common power converter. The load conditions may be a transferred power of the common power converter and a voltage ratio of the common power converter. The method may also include deactivating the determined number of power converters of the plurality of power converters.

Another example aspect of the present disclosure is directed to a controller for power control of a plurality of power converters. The controller may include a processor configured to determine a number of power converters to be deactivated of the plurality of power converters based on load conditions of a common power converter. The load conditions may be a transferred power of the common power converter and a voltage ratio of the common power converter. The processor may also be configured to deactivate the determined number of power converters of the plurality of power converters.

A further example aspect of the present disclosure is directed to a system comprising a plurality of power converters. The system may be configured to determine, based at least in part on load conditions of a common power converter, a number of power converters, of the plurality of power converters, to be deactivated. The load conditions may be a transferred power of the common power converter and a voltage ratio of the common power converter. The system may also be configured to deactivate the number of power converters.

The above and other aspects and their implementations are described in greater detail in the drawings, the descriptions, and the claims.

DETAILED DESCRIPTION

Figure 1:
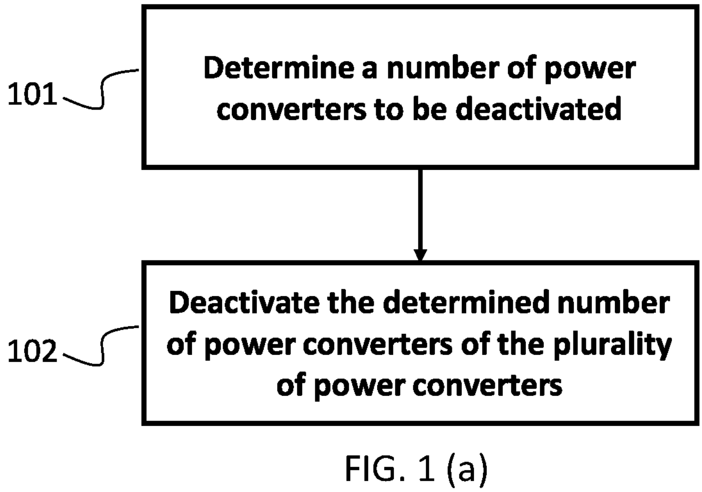
FIGS. 1(*a*) and 1(*b*) show flow charts according to embodiments of the present disclosure.
Figure 1:
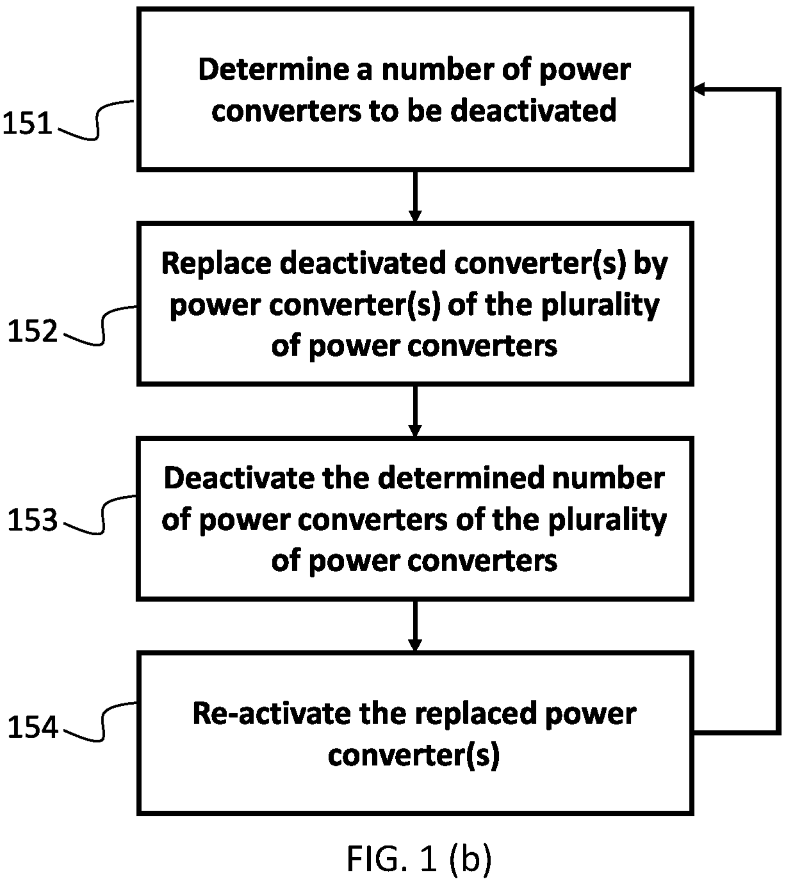

In the following, exemplary embodiments of the disclosure will be described. It is noted that some aspects of any one of the described embodiments may also be found in some other embodiments unless otherwise stated or obvious. However, for increased intelligibility, each aspect will only be described in detail when first mentioned and any repeated description of the same aspect will be omitted.

The present disclosure relates to a method for power control of a plurality of power converters forming a common power converter, the method comprising: determining a number of power converters to be deactivated of the plurality of power converters based on at least one load condition of the common power converter; and deactivating the determined number of power converters of the plurality of power converters.

According to an embodiment, the at least one load condition at the input or at the output of the common power converter is at least one of a transferred power of the common power converter or a voltage ratio of the at least one common power converter, particularly the determining a number of power converters is based on the transferred power of the common power converter and the voltage ratio of the at least one common power converter.

According to an embodiment, the method further comprises replacing at least one of the power converters which is deactivated by at least one other power converter of the plurality of power converters which is not deactivated after a set period of time, particularly after at least one duty cycle of the common power converter, more particularly after one duty cycle of the common power converter. According to an embodiment, the replacing may be performed subsequently. According to an embodiment, the replacing may be performed simultaneously.

According to an embodiment, the method further comprises re-activating the at least one replaced power converter after the set period of time, particularly after the at least one duty cycle of the common power transformer, more particularly after the one duty cycle of the common power converter. According to an embodiment, the replacing and the re-activating may be performed subsequently. According to an embodiment, the replacing and the re-activating may be performed simultaneously.

According to an embodiment, the set period of time is an external reference clock.

According to an embodiment, the set period of time is an asynchronous or event-driven clock.

According to an embodiment, the method further comprises monitoring the at least one load condition and repeatedly determining the number of power converters to be deactivated of the plurality of power converters based on the monitored at least one load condition of the common power converter and repeatedly deactivating the determined number of power converters of the plurality of power converters.

According to an embodiment, the plurality of converters consists of or comprises solid state converters.

According to an embodiment, the plurality of converters comprises at least one of a half bridge converter, a full bridge converter, a matrix converter, a neutral point clamped converter, a flying capacitor converter, a cascaded H-bridge converter, or a modular multilevel converter.

According to an embodiment, the plurality of the converters is a DC/DC converter, in particular an isolated DC/DC converter comprising a AC/DC rectifier, a medium frequency transformer, and a DC/AC inverter.

According to an embodiment, the plurality of converters is arranged so that the common converter has at least one of a series input and a parallel output, a series input and a series output, or a parallel input and parallel output.

According to an embodiment, the deactivating of the determined number of power converters is performed by generating zero AC voltage or DC voltage in a half period of a resonant cycle of the power converter to be deactivated.

According to an embodiment, the deactivating of the determined number of power converters is performed by generating zero AC voltage or DC voltage in a half period of an AC cycle of the power converter to be deactivated.

The present disclosure also relates to a controller for power control of a plurality of power converters, the system controller comprising a processor configured to: determine a number of power converters to be deactivated of the plurality of power converters based on at least one load condition of the common power converter; and deactivate the determined number of power converters of the plurality of power converters.

According to an embodiment, the at least one load condition at the input or at the output of the common power converter is at least one of a transferred power of the common power converter or a voltage ratio of the at least one common power converter, particularly the determining a number of power converters is based on the transferred power of the common power converter and the voltage ratio of the at least one common power converter.

According to an embodiment, the processor is configured to replace at least one of the power converters which is deactivated by at least one other power converter of the plurality of power converters which is not deactivated after a set period of time, particularly after at least one duty cycle of the common power converter, more particularly after one duty cycle of the common power converter. According to an embodiment, the replacing may be performed subsequently. According to an embodiment, the replacing may be performed simultaneously.

According to an embodiment, the processor is configured to re-activate the at least one replaced power converter after the set period of time, particularly after the at least one duty cycle of the common power transformer, more particularly after the one duty cycle of the common power converter. According to an embodiment, the replacing and the re-activating may be performed subsequently. According to an embodiment, the replacing and the re-activating may be performed simultaneously.

According to an embodiment, the set period of time is an external reference clock.

According to an embodiment, the set period of time is an asynchronous or event-driven clock.

According to an embodiment, the controller is configured to monitor the at least one load condition and the processor is configured to repeatedly determine the number of power converters to be deactivated of the plurality of power converters based on the monitored at least one load condition of the common power converter and repeatedly deactivate the determined number of power converters of the plurality of power converters. It is understood by the skilled person that the monitoring may be performed by respective input signals input into the controller.

According to an embodiment, the plurality of converters consists of or comprises solid state converters.

According to an embodiment, the plurality of converters comprises at least one of a half bridge converter, a full bridge converter, a matrix converter, a neutral point clamped converter, a flying capacitor converter, a cascaded H-bridge converter, or a modular multilevel converter.

According to an embodiment, the plurality of the converters is a DC/DC converter, in particular an isolated DC/DC converter comprising a AC/DC rectifier, a medium frequency transformer, and a DC/AC inverter.

According to an embodiment, the plurality of converters is arranged so that the common converter has at least one of a series input and a parallel output, a series input and a series output, or a parallel input and parallel output.

According to an embodiment, the processor is configured to deactivate the determined number of power converters by generating zero AC voltage or DC voltage in a half period of a resonant cycle of the power converter to be deactivated.

According to an embodiment, the processor is configured to deactivate the determined number of power converters by generating zero AC voltage or DC voltage in a half period of an AC cycle of the power converter to be deactivated.

The present disclosure also relates to a system comprising a controller according to any one of the above-described embodiments and a plurality of power converters to perform a method for power control of a plurality of power converters according to any one of the above-described embodiments.

FIGS. 1(*a*) and 1(*b*) show flow charts according to embodiments of the present disclosure. In particular, in the embodiment shown in FIG. 1(*a*), a number of power converters to be deactivated of the plurality of power converters is determined based on at least one load condition of the common power converter, 101. Then, the determined number of power converters of the plurality of power converters are deactivated, 102.

In the embodiment shown in FIG. 1(*b*), a number of power converters to be deactivated of the plurality of power converters is determined based on at least one load condition of the common power converter, 151. The at least one of the power converters which is deactivated is replaced by at least one other power converter of the plurality of power converters which is not deactivated after a set period of time, 152. The determined number of power converters of the plurality of power converters are deactivated, 153. The at least one replaced power converter is re-activated after the set period of time, 154. Note that the replacing, the deactivating and the re-activating may be performed subsequently or simultaneously.

The term 'replace' in the embodiment shown FIG. 1(*b*) is not limited to one to one correspondence between or among power converters. That is, the number of the at least one of the power converters which is deactivated may be equal or different to the number of the replacing at least one of the power converters.

The term 'replace' in the embodiment shown FIG. 1(*b*) refers to, in particular, determining a combination of power converters to be activated and deactivated among the plurality of the power converters.

According to an embodiment, the number of power converters to be deactivated is an integer and equal to or greater than 0, in particular greater than 1, and smaller than the number of the plurality of power converters.

According to an embodiment, the set period of time is at least one duty cycle of the common power converter, more particularly after one duty cycle of the common power converter. According to an embodiment, the set period of time is an external reference clock.

According to an embodiment, the set period of time is an asynchronous or event-driven clock.

According to an embodiment, the at least one load condition of the common power converter is at least one of a transferred power at the input or at the output of the common power converter or a voltage ratio of the at least one common power converter, particularly the determining a number of power converters is based on the transferred power of the common power converter and the voltage ratio of the at least one common power converter.

According to an embodiment, the method further comprises replacing at least one of the power converters which is deactivated by at least one other power converter of the plurality of power converters which is not deactivated and re-activating the at least one replaced power converter after a set period of time, particularly after at least one duty cycle of the common power converter, more particularly after one duty cycle of the common power converter.

According to an embodiment, the method further comprises monitoring the at least one load condition and repeatedly determining the number of power converters to be deactivated of the plurality of power converters based on the monitored at least one load condition of the common power converter and repeatedly deactivating the determined number of power converters of the plurality of power converters.

Figure 2:
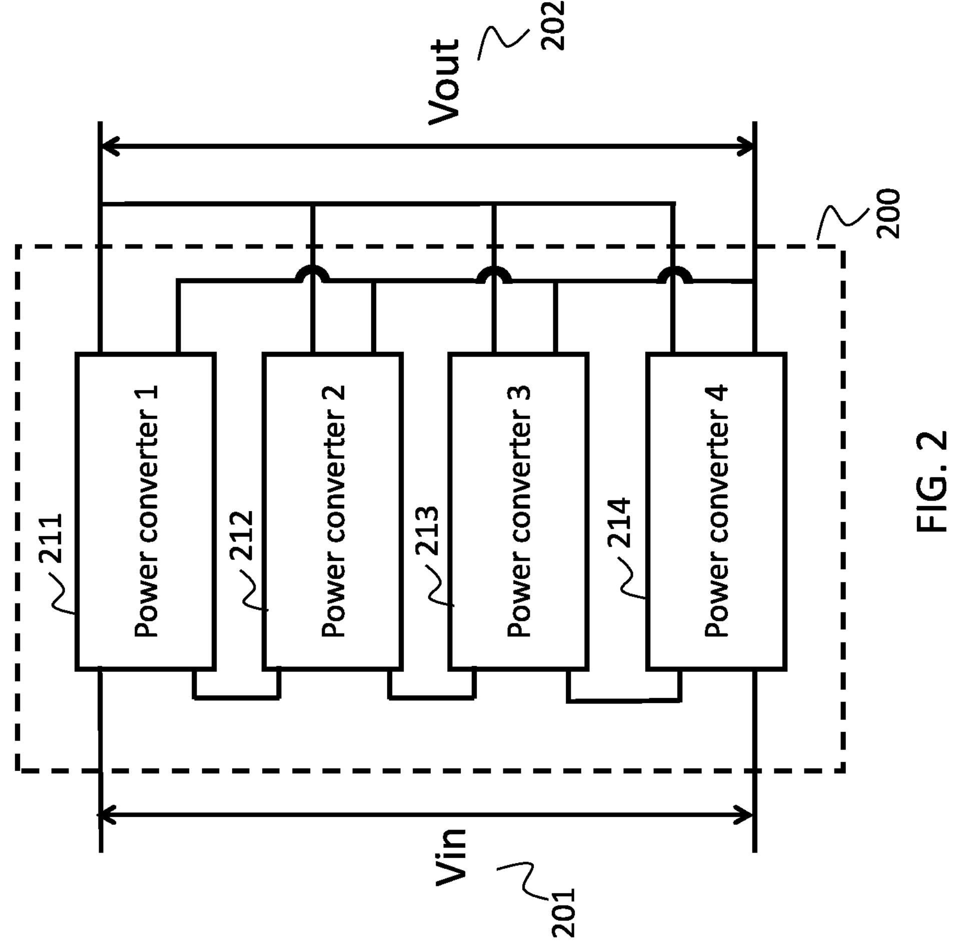
FIG. 2 shows an exemplary plurality of power converters according to an embodiment of the present disclosure, in particular the plurality of power converters is interconnected in a series input, parallel output topology and form a common converter.

In the embodiment shown in FIG. 2, four power converters 211 . . . 214 are interconnected in a series input and parallel output topology and the interconnected four power converters 211 . . . 214 form a common power converter 200. An input voltage of the common converter 201 is converted to an output voltage of the common converter 202 via the common converter 200.

It is understood by the skilled person that the common converter 200 can be used in reverse mode. That is, the voltage at the output can be converted to the voltage at the input.

According to an embodiment, the plurality of converters consists of or comprises solid state converters.

According to an embodiment, the plurality of converters comprises at least one of a half bridge converter, a full bridge converter, a matrix converter, a neutral point clamped converter, a flying capacitor converter, a cascaded H-bridge converter, or a modular multilevel converter.

According to an embodiment, the plurality of the converters is a DC/DC converter, in particular an isolated DC/DC converter comprising a AC/DC rectifier, a medium frequency transformer, and a DC/AC inverter.

According to an embodiment, the plurality of converters is arranged so that the common converter has at least one of a series input and a parallel output, a series input and a series output, or a parallel input and parallel output.

Figure 3:
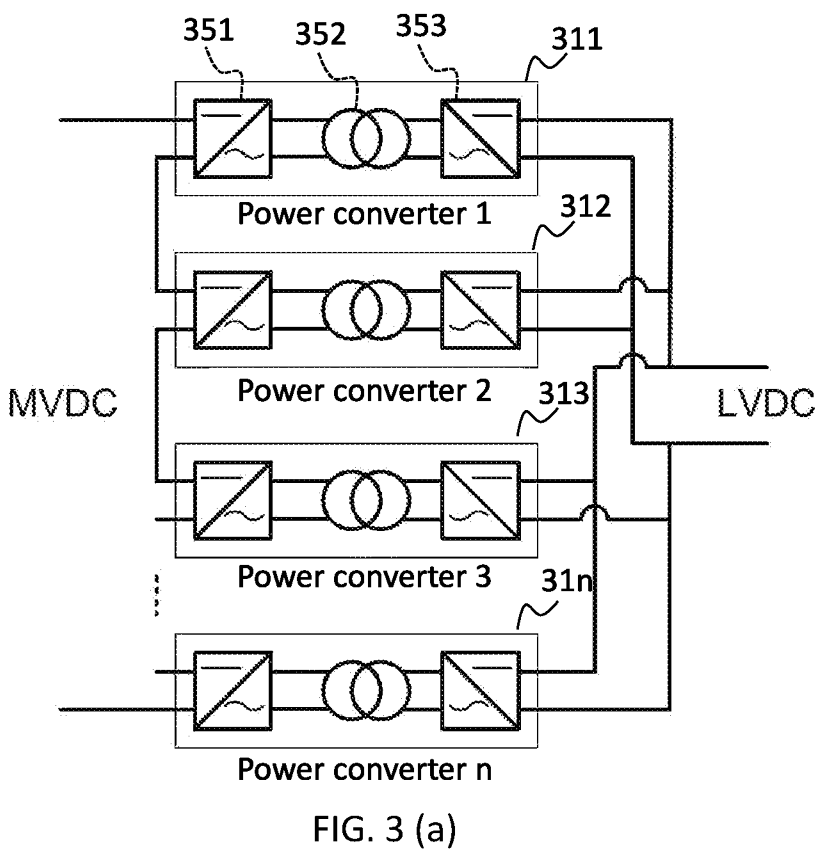
FIGS. 3(*a*), 3(*b*), and 3(*c*) show exemplary power converters in various topological configurations according to embodiments of the present disclosure.
Figure 3:
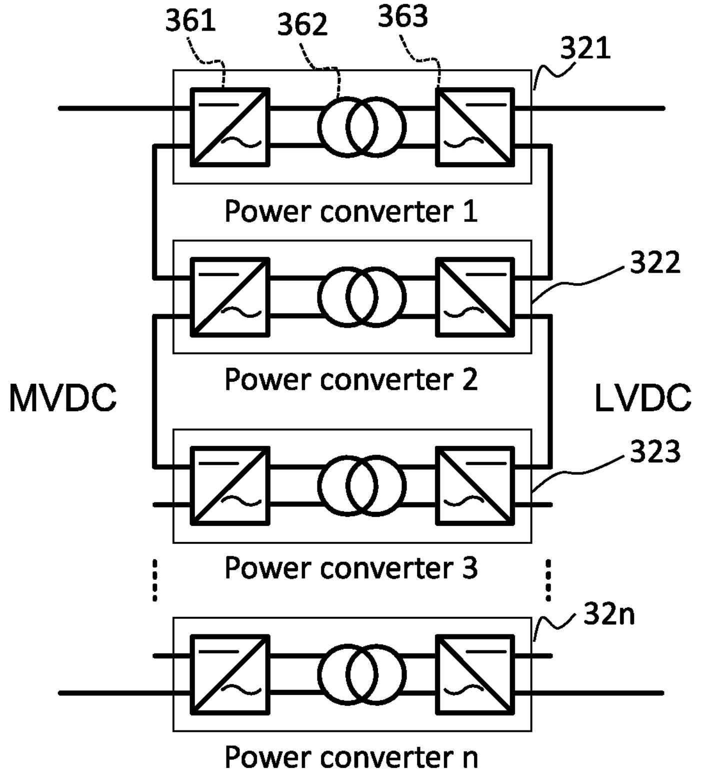
Figure 3:
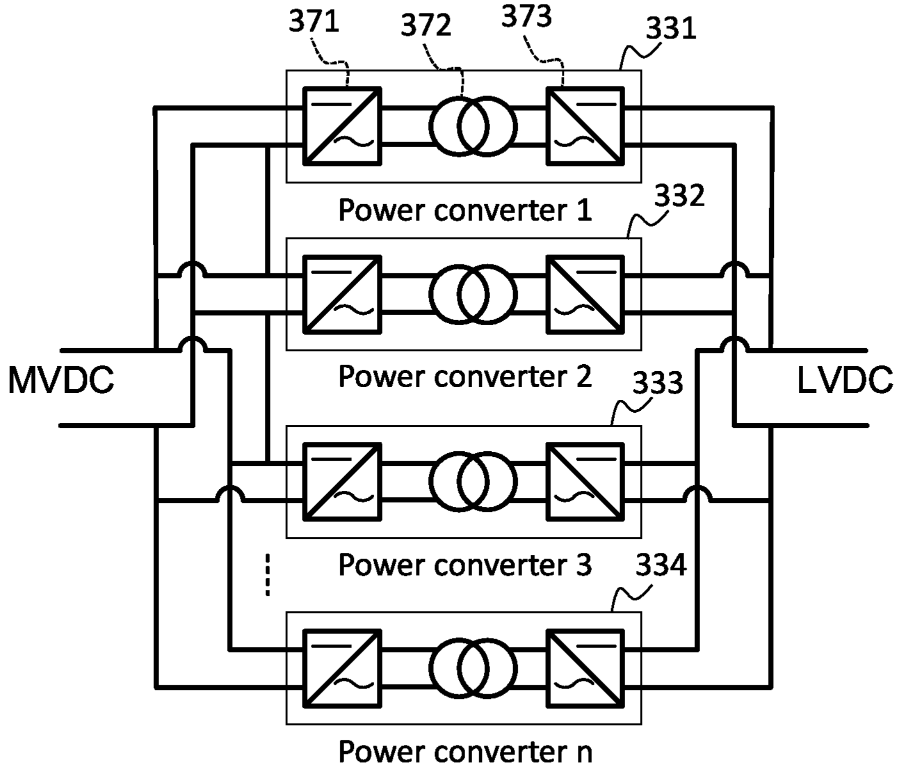

FIGS. 3(*a*), 3(*b*), and 3(*c*) show exemplary power converters in various topological configurations according to embodiments of the present disclosure. The n power converters 311 . . . 31*n* shown in FIG. 3(*a*) are interconnected in a series input, parallel output topology and the interconnected plurality of power converters form a DC/DC common converter. Each of the n power converters 311 . . . 31*n* comprises a DC/AC inverter 351, a transformer 352, and an AC/DC rectifier 353.

The n power converters 321 . . . 32*n* shown in FIG. 3(*b*) are interconnected in a series input, series output topology and the interconnected plurality of power converters form a DC/DC common converter. Each of the n power converters 321 . . . 32*n* comprises a DC/AC inverter 361, a transformer 362, and an AC/DC rectifier 363. The n power converters 331 . . . 33*n* shown in FIG. 3(*c*) are interconnected in a parallel input, parallel output topology and the interconnected plurality of power converters form a DC/DC common converter. Each of the n power converters 331 . . . 33_n_ comprises a DC/AC inverter 371, a transformer 372, and an AC/DC rectifier 373.

Figure 4:
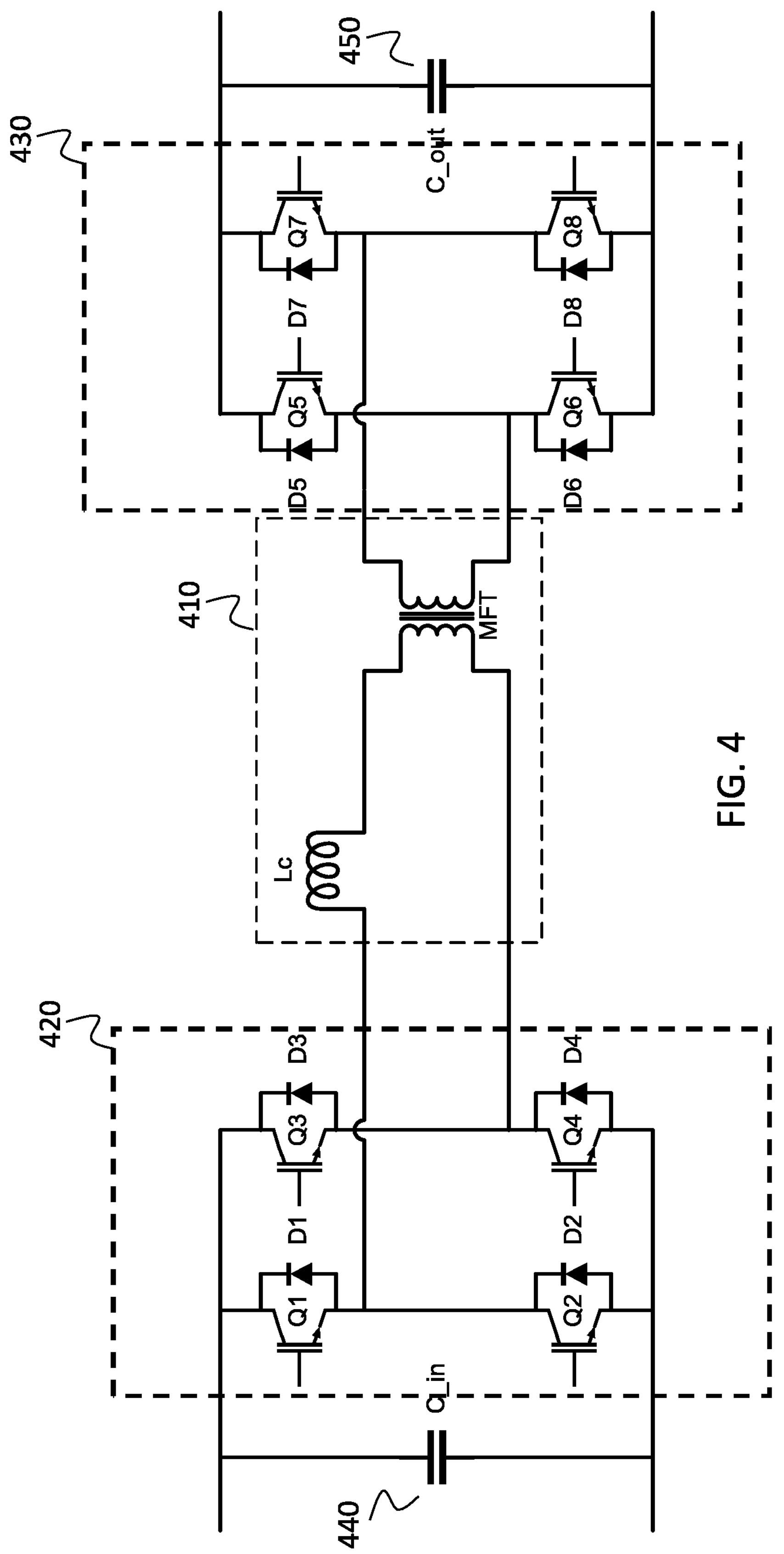
FIG. 4 shows an exemplary power converter architecture of a plurality of the power converters according to an embodiment of the present disclosure, in particular a dual active bridge (DAB) power converter.
Figure 5:
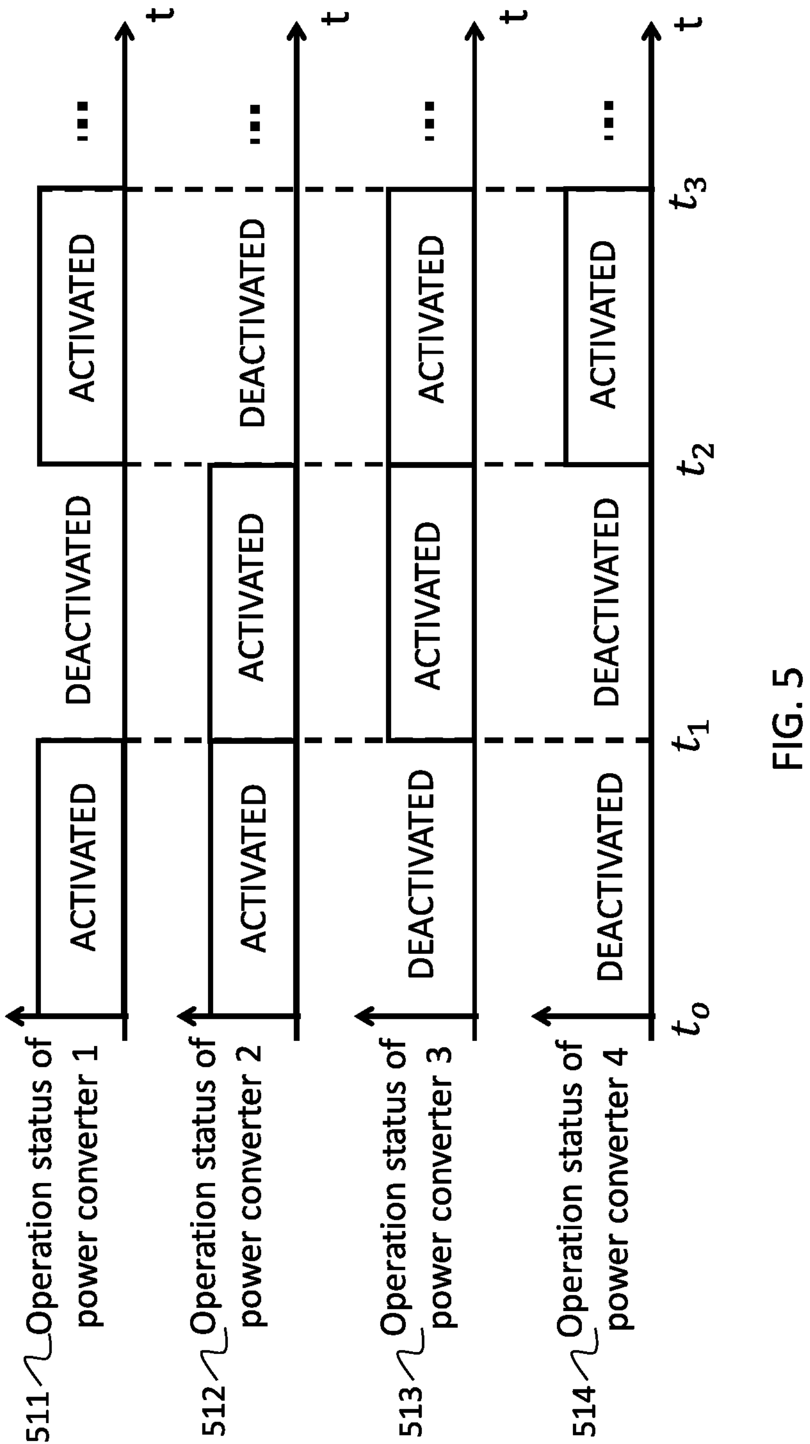
FIG. 5 shows an exemplary operation status of the plurality of power converters according to an embodiment of the present disclosure, in particular that shown in FIG. 1(*b*) and FIG. 2.

FIG. 4 shows an exemplary power converter architecture of the plurality of the power converters, in particular a dual active bridge (DAB) power converter, more particularly the DAB comprising a transformer 410, a primary full bridge 420 at the input, and a secondary full bridge 430 at the output of the converter. The transformer 410 is connected to both primary full bridge 420 and secondary bridge 430. The primary full bridge 420 comprises four diodes D1 to D4 parallel connected to the respective four insulated-gate bipolar transistor (IGBTs) Q1 to Q4 to form a full bridge. The primary full bridge 420 is connected to an input capacitor 440. The secondary full bridge 430 comprises four diodes D5 to D8 parallel connected to the respective four IGBTs Q5 to Q8 to form a full bridge. The secondary full bridge 430 is connected to an output capacitor 450. In the embodiment shown in FIG. 5, four operation statuses 511 . . . 514 represent the operation status of the respective power converters 211 . . . 214 of the embodiment shown in FIG. 2 and follow the method of the embodiment shown in FIG. 1(_b_). During time instances up to $t_0$, the number of power converters to be deactivated of the plurality of power converters is determined based on at least one load condition at the input of or at the output of the common power converter 200. In the exemplary embodiment shown in FIG. 5, the number of power converters to be deactivated is 2 for the time range $t_0 \le t < t_1$. At $t_0$, a third power converter 213 and a fourth power converter 214 are deactivated and a first power converter 211 and a second power converter 212 are activated. Similarly, during the time range to $t_0 \le t < t_1$, the number of power converters to be deactivated for the subsequent time range $t_1 \le t < t_2$ is determined, based on at least one load condition at the input of or at the output of the common power converter 200, to be 2 in this exemplary embodiment. The third power converter 213 which is deactivated during the time range $t_0 \le t < t_1$ is replaced by the first power converter 211. At $t_1$, the second power converter 212 and the third power converter 213 are deactivated and the replaced third power converter 213 is re-activated. Again, during the time range $t_1 \le t < t_2$, the number of power converters to be deactivated during the subsequent time range $t_2 \le t < t_3$ is determined, based on at least one load condition at the input of or at the output of the common power converter 200, to be 3 in this exemplary embodiment. The first power converter 211 and the fourth power converter 214 which are deactivated during the time range $t_1 \le t < t_2$ are replaced by the second power converter 212. At $t_2$, the second power converter 212 is deactivated and the replaced first and third power converters 211 & 214 are re-activated.

It is understood by the skilled person that the at least one activated power converter contributes to a power transfer of the common power converter and deactivated power converters do not contribute to the power transfer of the common power converter. That is, as a result of activation and deactivation of power converters, the power transfer of the common power converter varies.

According to an embodiment, replacing of the at least one deactivated power converter of the plurality of the power converters by the at least one activated power converter of the plurality of the power converters after a set period of time may activate and deactivate any possible combination of the plurality of the power converters.

According to an embodiment, the method further comprises re-activating the at least one replaced power converter after the set period of time, particularly after the at least one duty cycle of the common power converter, more particularly after the one duty cycle of the common power converter.

According to an embodiment, the deactivating of the determined number of power converters is performed by generating zero AC voltage or DC voltage in a half period of a resonant cycle of the power converter to be deactivated.

According to an embodiment, the deactivating of the determined number of power converters is performed by generating zero AC voltage or DC voltage in a half period of an AC cycle of the power converter to be deactivated.

According to an embodiment of the present disclosure, the number of power converters to be deactivated can be computed/calculated as follows:

$$n_{deact} = n_{pc} - \text{round}\left(\frac{P_{com} \times \frac{P_{op}}{P_{com}} \times 100}{P_{\eta opt}}\right) \quad (1)$$

where $n_{deact}$ and $n_{pc}$ denote a number of cells/power converters to be deactivated and a total number of power converters, respectively and $P_{com}$, $P_{op}$, and $P_{\eta opt}$ denote a total transferrable power of the common power converter, an operational power of the common power converter, and an optimal power of the common power converter at which the power transfer efficiency of the common power converter is the highest, respectively.

According to an embodiment of the present disclosure, a power transfer efficiency of a power converter is a function of voltage ratio of a power converter and a transferred power.

According to an embodiment of the present disclosure, a voltage ratio of a power converter, in particular of an isolated power converter comprising a transformer, can be computed/calculated as follows:

$$d = n_{TR} \times \frac{V_{out}}{V_{in}} \quad (2)$$

where d, $n_{TR}$, $V_{out}$ and $V_{in}$ denote a voltage ratio of the power converter, a turn ratio of a transformer, an output voltage of the power converter, and an input voltage of the power converter, respectively.

According to an embodiment of the present disclosure, the optimal power of a common power converter $P_{\eta opt}$ is computed/calculated based on a power transfer efficiency of a power converter.

Figure 6:
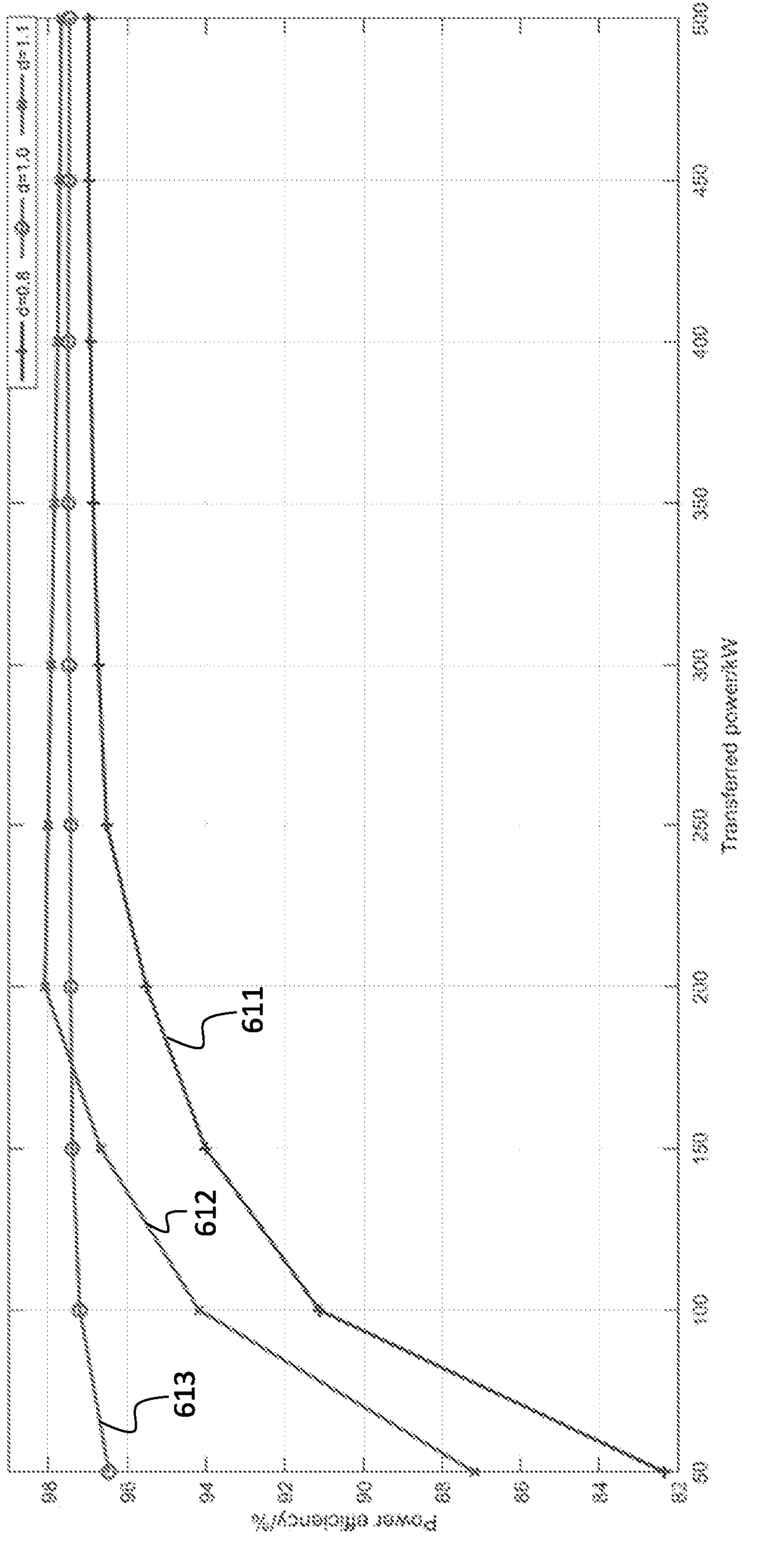
FIG. 6 shows an exemplary simulation result of a power transfer efficiency of the plurality of power converters with respect to a transferred power of the plurality of power converters and a voltage ratio.

FIG. 6 shows an exemplary simulation result of a power transfer efficiency of the plurality of power converters with respect to a transferred power of the plurality of power converters and a voltage ratio according to an embodiment of the present disclosure. The power transfer of the plurality of power converters shown in FIG. 6 is equivalent to the power transfer of the common power converter formed by the plurality of power converters. The plurality of power converters used for the simulation are silicon insulated-gate bipolar transistor (Si-IGBT) based dual active bridge (DAB) power converters, each comprising a transformer with identical turn ratio of the transformer. The voltage ratios d=0.8, d=1.0, and d=1.1 are calculated according to eq. (2) and correspond to the power transfer efficiency curves 611 . . . 613, respectively. The power transfer efficiency curves 611 . . . 613 show the decline in power transfer efficiency of the plurality of the power converters with a decreasing transferred power. The optimal power at which the power transfer efficiency is the highest can be computed/calculated based on the power transfer efficiency curves 611 . . . 613 for each voltage ratio.

It is understood by the skilled person that a type or a combination of the plurality of power converters is not limited to the SI-IGBT based DAB power converters.

Figure 7:
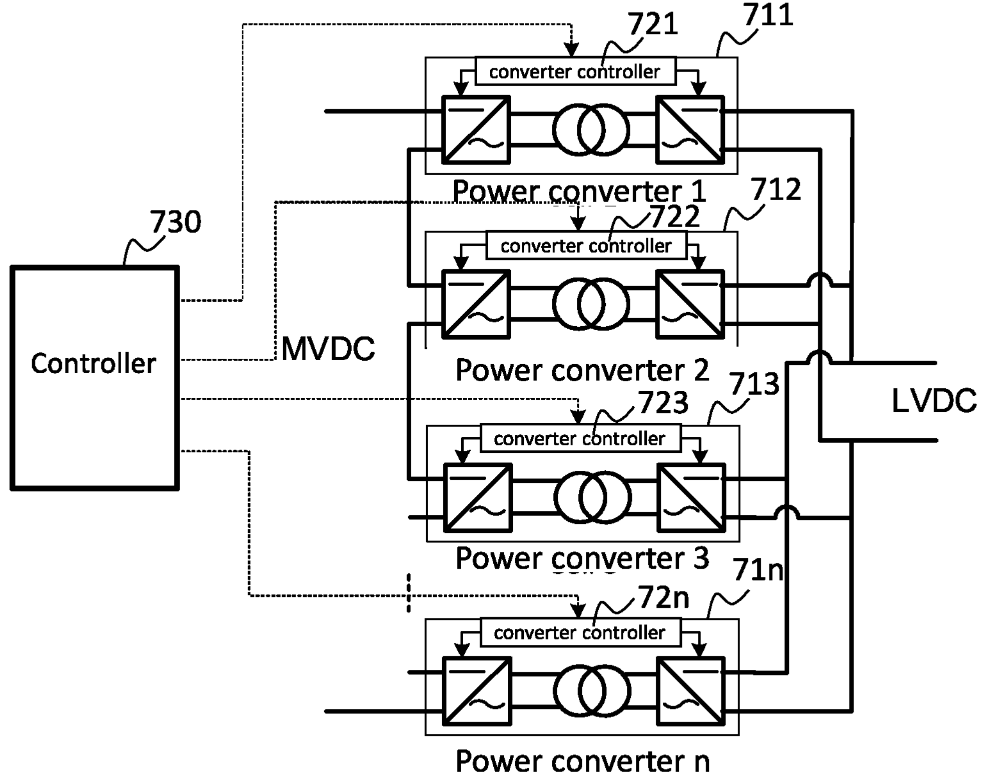
FIG. 7 shows an exemplary controller and a plurality of power converters interconnected in a series input, parallel output topology, wherein each power converter of the plurality of power converters comprises a converter controller.

FIG. 7 shows an exemplary converter and a plurality of power converters interconnected in a series input, parallel output topology, wherein each power converter of the plurality of power converters comprises a converter controller. The n power converters 711 . . . 71*n* shown in FIG. 7 are interconnected in a series input, parallel output topology and the interconnected plurality of power converters form a DC/DC common converter. Each of the n power converters 711 . . . 71*n* comprises a DC/AC inverter, a transformer, an AC/DC rectifier, and the respective converter controllers 721 . . . 72*n*. The controller 730 controls each of the converter controllers 721 . . . 72*n* which in turn controls the respective power converter to activate, deactivate, and reactivate the respective power converter.

It is understood by the skilled person that the converter controllers 721 . . . 72*n* may be implemented as a part of the controller 730.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative methods, logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for power control of a plurality of power converters forming a common power converter, the method comprising:

determining a number of power converters to be deactivated of the plurality of power converters based on load conditions of the common power converter, wherein the load conditions are a transferred power of the common power converter and a voltage ratio of the common power converter; and deactivating the determined number of power converters of the plurality of power converters.

2. The method according to claim 1, comprising replacing at least one of the power converters which is deactivated by at least one other power converter of the plurality of power converters which is not deactivated after a set period of time.

3. The method according to claim 2, comprising reactivating the at least one replaced power converter after the set period of time.

4. The method according to claim 1, further comprising monitoring the load conditions and determining the number of power converters to be deactivated of the plurality of power converters based on the monitored load conditions of the common power converter; and deactivating the determined number of power converters of the plurality of power converters.

5. The method according to claim 1, wherein the plurality of power converters comprises solid state converters.

6. The method according to claim 1, wherein the plurality of power converters comprises at least one of a half bridge converter, a full bridge converter, a matrix converter, a neutral point clamped converter, a flying capacitor converter, a cascaded H-bridge converter, or a modular multilevel converter.

7. The method according to claim 1, wherein the plurality of power converters is arranged so that the common converter has at least one of a series input and a parallel output, a series input and a series output, or a parallel input and a parallel output.

8. The method according to claim 1, wherein the deactivating of the determined number of power converters is performed by generating zero AC voltage or DC voltage in a half period of a resonant cycle of the power converter to be deactivated.

9. The method according to claim 1, wherein the deactivating of the determined number of power converters is performed by generating zero AC voltage in a half period of an AC cycle of the power converter to be deactivated.

10. A controller for power control of a plurality of power converters, the controller comprising a processor configured to:

determine a number of power converters to be deactivated of the plurality of power converters based on load conditions of a common power converter, wherein the load conditions are a transferred power of the common power converter and a voltage ratio of the common power converter; and deactivate the determined number of power converters of the plurality of power converters.

11. The controller of claim 10, wherein the processor is further configured to replace at least one of the power converters which is deactivated by at least one other power converter of the plurality of power converters which is not deactivated after a set period of time.

12. The controller of claim 11, wherein the processor is further configured to re-activate the at least one replaced power converter after the set period of time.

13. The controller of claim 10, wherein the controller is further configured to monitor the load conditions and the processor is configured to determine the number of power converters to be deactivated of the plurality of power converters based on the monitored load conditions of the common power converter; and deactivate the determined number of power converters of the plurality of power converters.

14. A system comprising a plurality of power converters and configured to:

determine, based at least in part on load conditions of a common power converter, a number of power converters, of the plurality of power converters, to be deactivated, wherein the load conditions are a transferred power of the common power converter and a voltage ratio of the common power converter; and deactivate the number of power converters.

15. The system of claim 14, wherein the system is configured to replace at least one of the power converters which is deactivated by at least one other power converter of the plurality of power converters which is not deactivated after the set period of time.

16. The system of claim 15, wherein the set period of time comprises one duty cycle of the common power converter.

17. The system of claim 15, wherein the system is configured to re-activate the at least one replaced power converter after the set period of time.

18. The system of claim 17, wherein the set period of time comprises one duty cycle of the common power converter.

19. The system of claim 14, wherein the plurality of power converters comprises solid state converters.

20. The system of claim 14, wherein the plurality of power converters comprises at least one of a half bridge converter, a full bridge converter, a matrix converter, a neutral point clamped converter, a flying capacitor converter, a cascaded H-bridge converter, or a modular multilevel converter.

* * * * *